Figure 1:
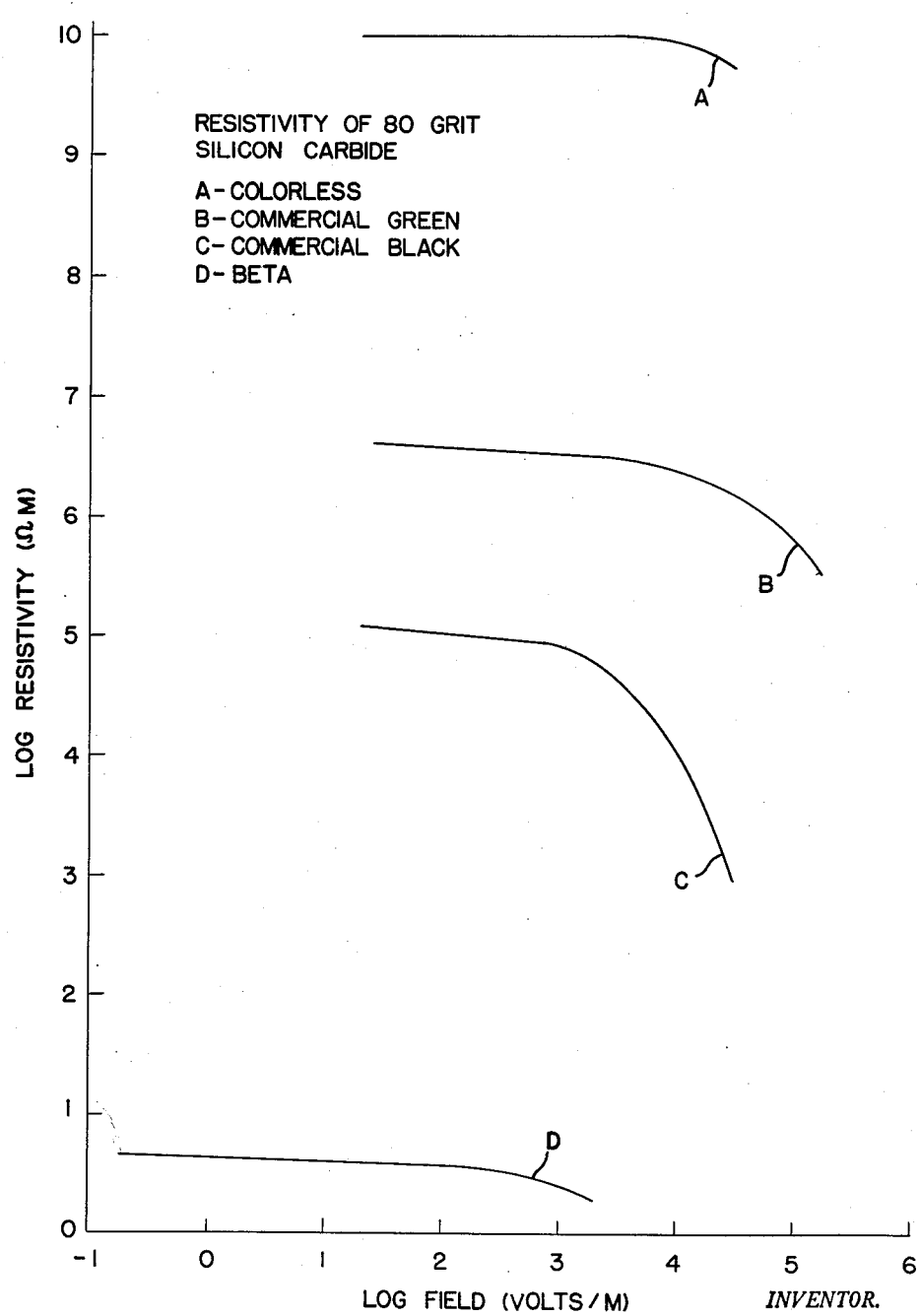

United States Patent Office 3,074,887
Patented Jan. 22, 1963

3,074,887
PROCESS FOR ADJUSTING THE ELECTRICAL CHARACTERISTICS OF SILICON CARBIDE CRYSTALS
Paul E. Carroll, Tonawanda, N.Y., assignor to The Carborundum Company, Niagara Falls, N.Y., a corporation of Delaware
Filed Mar. 27, 1959, Ser. No. 802,462
9 Claims. (Cl. 252—62.3)

This invention relates to crystalline silicon carbide having controlled electrical characteristics, and to a method of producing it.

Silicon carbide is a material of considerable interest for many electrical applications such as, for example, rectifiers, transistors, and voltage-dependent resistors (varistors). For such applications, silicon carbide is attractive because of its refractory nature, good physical characteristics, and chemical inertness. Although silicon carbide is a semiconductor, practical applications, to take advantage of this property, have not been made because of the difficulty of preparing silicon carbide in the relatively pure form that is required.

The two common varieties of silicon carbide, that are commercially available, are black and green. Both contain relatively large amounts of impurities. The green variety has a characteristically relatively higher electrical resistivity than the black variety. The green color is attributed to the presence in the silicon carbide lattice of pentavalent nitrogen, a "donor" or n-type impurity.

The green variety of silicon carbide is employed in making electrical resistance heating elements. Usually, special processing of ordinary green silicon carbide is required in order to reduce its electrical resistance, to make it suitable for use in heating elements.

Granular silicon carbide is characterized by non-linear interfacial electrical conductivity. The black variety of silicon carbide exhibits the greatest rate of change of resistivity with changes in the electrical field, in its non-linear conduction, and use is made of this characteristic in lightning arrestors. A typical element in a silicon carbide lightning arrestor comprises a monolith of separate but contiguous grains of black silicon carbide in a ceramic bond. In an element of this type, most of the voltage drop occurs at the interfaces between the grains. The current that is passed increases very rapidly with increasing voltage, because of the non-linear interfacial conductivity of the grain. While non-linear interfacial conductivity is common to all varieties of silicon carbide, the black variety is usually employed for applications that utilize this property because of its superior body conductivity and greater rate of change of conductivity with electrical field in the non-linear region. The black color is attributed to the presence of aluminum that is purposely added during the furnace production of this variety of silicon carbide. Aluminum is an "acceptor" type or p-type of impurity.

The common green variety of silicon carbide contains a third variety of silicon carbide, colorless silicon carbide, in amounts on the order of 10% to 20% of colorless silicon carbide, together with relatively minor amounts of darker crystals that are either very dark green or black. The colorless crystals of silicon carbide are characterized by relatively higher electrical resistance than the black and the green crystals. The difference in resistivity permits separation of the colorless crystals from green crystals by electrostatic separation. Colorless crystals of silicon carbide are a relatively pure form of silicon carbide, although sufficient impurities are present to provide both n-type and p-type body conductivity.

The terms "grain" and "crystals" are used substantially interchangeably herein, since a single granule of silicon carbide, of which grain is composed, is a small portion of a larger crystal.

Within each of the classes provided by the three respective varieties of crystalline silicon carbide, there may be wide variations in electrical characteristics. While uniform electrical properties are strongly desired and much sought, close control over the purity, and thus over the electrical properties of silicon carbide, has been extremely difficult to attain as a practical matter. Nevertheless it is a fair generalization to say that the electrical conductivities can be ranked, in order of decreasing conductivity, as colorless, green, and black.

The lack of uniformity in the electrical properties of all varieties of crystalline silicon carbide, which is concomitant with lack of uniformity in purity, the relatively high resistivity, and the extreme difficulty of altering the purity and electrical properties in any practical manner, have limited the use of silicon carbide in many electrical applications, particularly in the semiconductor field.

One object of the present invention is to provide a practical process that will permit adjustment of the electrical characteristics of commercially available green silicon carbide to desired, preselected values.

Another object of the invention is to provide a process for the production of crystalline silicon carbide having preselected electrical characteristics.

Another object of the invention is to provide a practical process for improving the conductivity of colorless silicon carbide, to adjust it to values that permit its use in applications where improved electrical conductivity is essential, and where the other desirable characteristics of colorless silicon carbide can be used advantageously.

A further object of the invention is to provide crystals of silicon carbide that contain, within their preformed crystalline structures, added, controlled amounts of impurities that affect the electrical characteristics of the crystals.

Still another object of the invention is to provide crystals of silicon carbide that contain, within their preformed crystalline structures, added, controlled amounts of an element selected from the group consisting of elements from the third and fifth columns of the Mendeleeff Periodic Table, and particularly, nitrogen, phosphorus, boron and aluminum.

A more specific object of the invention is to provide discrete crystals of silicon carbide that are modified to contain, within their preformed, discrete crystalline structures, added, controlled amounts of nitrogen.

Yet another object of the invention is to provide discrete crystals of silicon carbide that are modified to contain, within their preformed, discrete crystalline structures, added, controlled amounts of silicon.

Other objects of the invention will be apparent hereinafter from the specification and from the recital of the appended claims.

I have found that the electrical characteristics of crystalline silicon carbide can be adjusted by heating the silicon carbide, (a) to a temperature of at least 1500° C. but below the temperature of recrystallization, (b) in the presence of an element that can diffuse into the silicon carbide crystals and therein modify the electrical properties thereof, and (c) for a sufficient time to permit sufficient diffusion to occur, to effect a desired adjustment in the electrical characteristics. Firing temperatures below 1500° C. can be employed, but the time that is required to effect diffusion at such lower temperatures, makes the use of such lower temperatures impractical and unattractive.

In a preferred embodiment of the invention, crystals of silicon carbide are heated in an atmosphere of gaseous nitrogen, at about 1950° C., for about two and one-half hours. There is reason to believe that diffusion of nitrogen into the crystals occurs; however, that this is the sole factor that causes the desired changes in electrical characteristics to occur is not entirely clear. It is quite possible that during the heat treatment there is an escape of aluminum by diffusion out of the crystals, which, if it occurs, upsets the balance between n-type and p-type impurities and accentuates the n-type conductivity. This type of outward diffusion may occur, for example, where the crystalline silicon carbide is subjected to heat treatment in the stated temperature range in an atmosphere of commercially pure hydrogen or argon, where the modification of the electrical characteristics, that is the object of this invention, has been observed to occur. Alternatively, in these latter cases, the explanation for the change may be the incorporation, in the lattice of the silicon carbide, of nitrogen that had been adsorbed on the crystal surface, as a part of the layer of gas that is bound on the surfaces of all crystals, and also perhaps adsorbed in internal crevices or pores in the crystal. Still another possible explanation may be that the nitrogen content, even of nitrogen-gettered, commercially pure argon and hydrogen, is sufficient to permit enough diffusion of nitrogen into the crystals to effect electrical property changes.

Extremely minute amounts of impurities exert a large effect on the electrical properties of the silicon carbide crystals. Because of the small quantities of the impurities that are involved, and because of the extremely refractory nature of the silicon carbide, accurate quantitative chemical analysis has been extremely difficult, and an accurate hypothesis, to explain my process, must await further refinements in analytical techniques. However, the invention is readily understood empirically, and is readily susceptible of demonstration, as will be seen from the following description and demonstrations of the invention.

All of the drawings are graphs in which the logarithm of the column electrical resistivity of a column of crystals of silicon carbide, in ohm-meters, is plotted against the logarithm of the electrical field that is applied to a column of crystals, under a standard pressure, in volts per meter.

In the drawings:

FIG. 1 includes curves A, B, C, and D, that describe the changes in column electrical resistivity with changes in the electrical field, of 80 grit silicon carbide of the following varieties, respectively: colorless, commercial green, commercial black, and the beta (cubic) crystalline variety.

Figure 2:
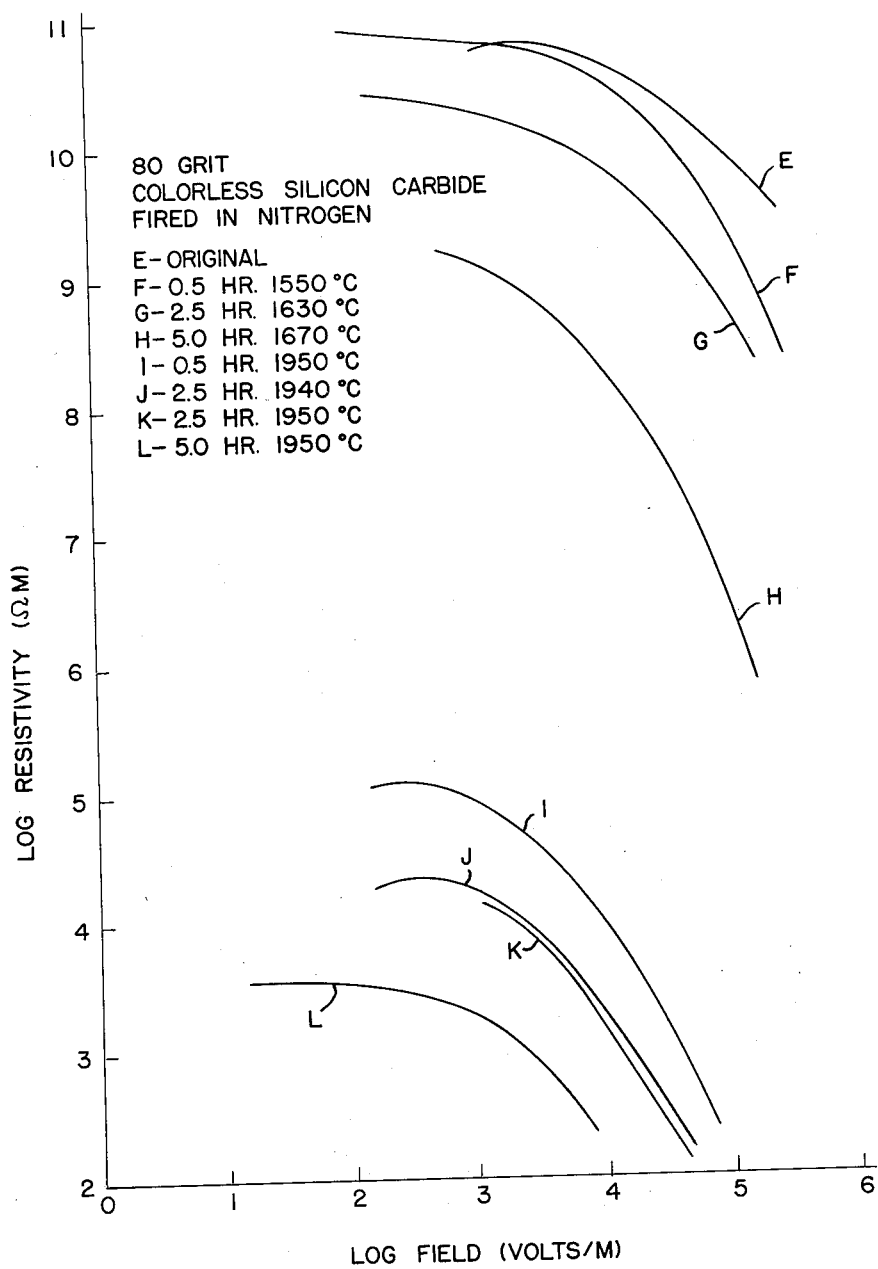

FIG. 2 includes curves E through L inclusive.

Curve E describes measurements of changes in the column electrical resistivity with changes in the applied electrical field, taken for 80 grit crystals of silicon carbide of the colorless variety before any treatment in accordance with this invention.

Curves F through L inclusive describe measurements of changes in the column electrical resistivity with changes in the applied electrical field, taken for 80 grit crystals of silicon carbide of the colorless variety, after firing in an atmosphere of nitrogen in accordance with one embodiment of this invention.

Curve F describes measurements obtained after firing in the nitrogen atmosphere for half an hour at 1550° C.

Curve G describes measurements obtained after firing for two and one-half hours at 1630° C.

Curve H describes measurements obtained after firing for five hours in a nitrogen atmosphere at 1670° C.

Curve I describes measurements obtained after firing for half an hour at 1950° C.

Curve J describes measurements obtained after firing for two and one-half hours at 1940° C.

Curve K describes measurements obtained after firing for two and one-half hours at 1950° C.

Curve L describes measurements obtained after firing for five hours at 1950° C.

Figure 3:
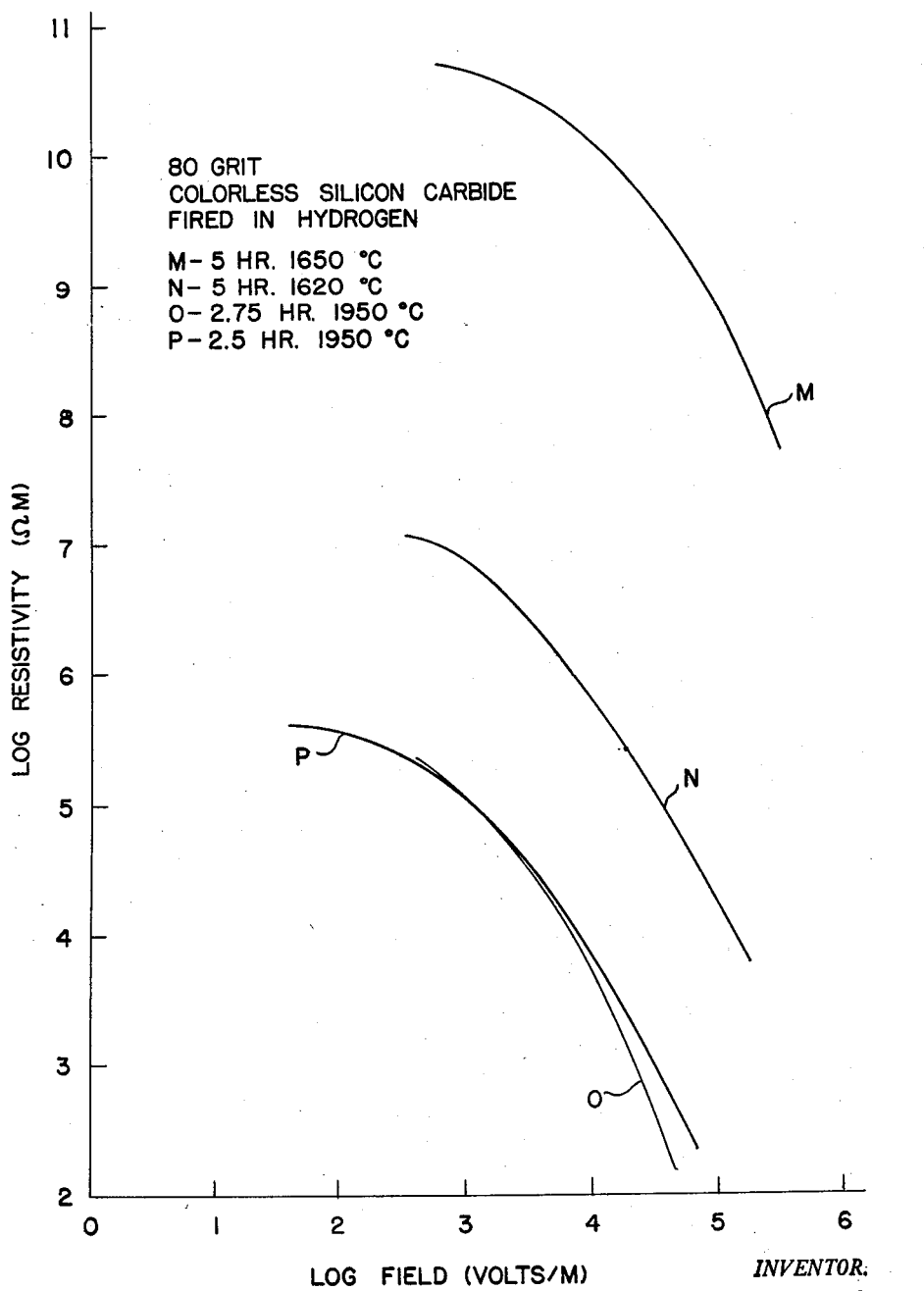

FIG. 3 includes curves M, N, O, and P, inclusive, which describe measurements of changes in the column electrical resistivity with changes in the applied electrical field, of 80 grit silicon carbide of the colorless variety, after heat treatment in an atmosphere of hydrogen in accordance with another embodiment of this invention.

Curve M describes measurements obtained after firing for five hours at 1650° C., in a nitrogen-gettered atmosphere.

Curve N describes measurements obtained after firing for five hours at 1620° C.

Curve O describes measurements obtained after firing for two and three-quarters hours at 1950° C.

Curve P describes measurements obtained after firing for two and one-half hours at 1950° C., in a nitrogen-gettered atmosphere.

Figure 4:
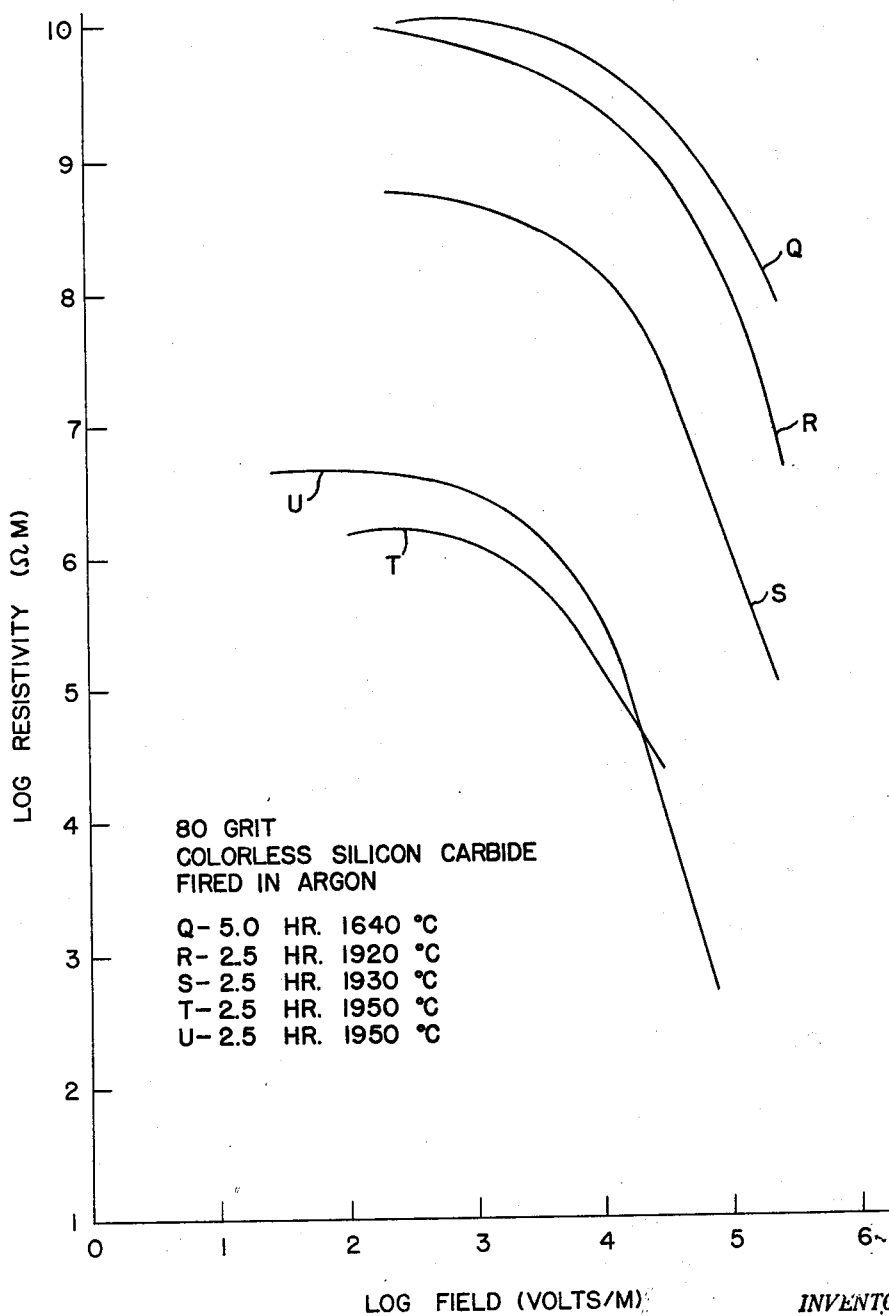

FIG. 4 includes curves Q, R, S, T, and U, inclusive, which describe measurements of changes in the column electrical resistivity with changes in the applied electrical field, for 80 grit silicon carbide crystals of the colorless variety, after heat treatment in an atmosphere of argon, in accordance with another embodiment of this invention.

Curve Q describes measurements obtained after firing for five hours at 1640° C.

Curve R describes measurements obtained after firing for two and one-half hours at 1920° C.

Curve S describes measurements obtained after firing for two and one-half hours at 1930° C.

Curve T describes measurements obtained after firing for two and one-half hours at 1950° C., in a nitrogen-gettered atmosphere.

Curve U describes measurements obtained after firing for two and one-half hours at 1950° C.

Figure 5:
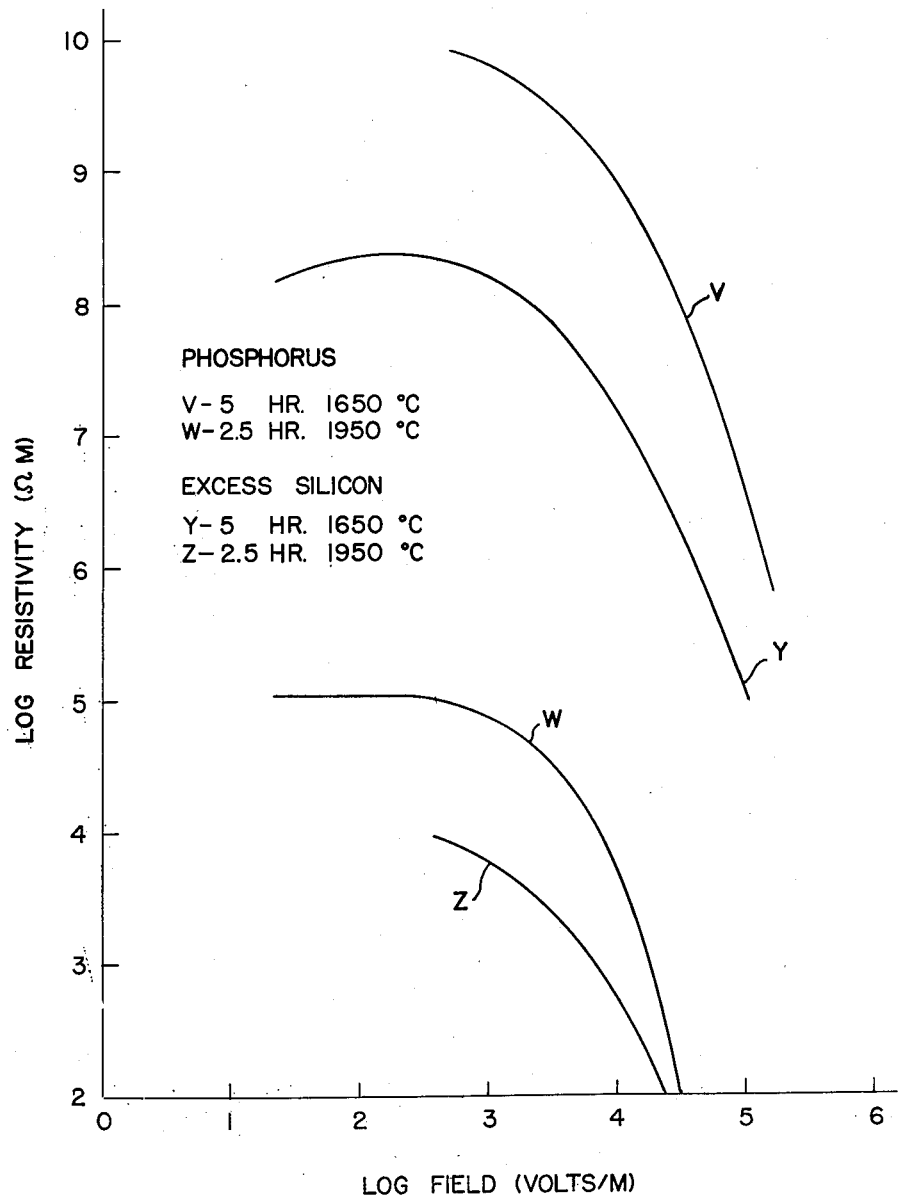

FIG. 5 includes curves V, W, Y, and Z, inclusive, which describe measurements of changes in the column electrical resistivity with changes in the applied electrical field, for 80 grit silicon carbide of the colorless variety, after firing in a controlled atmosphere, in accordance with other embodiments of this invention.

Curve V describes measurements obtained after firing for five hours at 1650° C. in an atmosphere of argon containing vapors of elemental phosphorus.

Curve W describes measurements obtained after firing for two and one-half hours at 1950° C. in an atmosphere of argon containing vapors of elemental phosphorus.

Curve Y describes measurements obtained after treatment for five hours at 1650° C. in an environment supplying elemental silicon.

Curve Z describes measurements obtained after treatment for two and one-half hours at 1950° C., in an environment supplying elemental silicon.

COLUMN RESISTIVITY DETERMINATIONS

To determine the column resistivity of a grain sample, the grain is placed in the bore of a cylinder molded from nylon and having a cross-sectional area of substantially one square inch. The nylon cylinder is closed at one end by a brass plunger, and another brass plunger is inserted in the other end. This assembly is placed inside a controlled humidity chamber, so that changes in atmospheric relative humidity do not affect the measurements. Pressure is applied to compress the column to a standard pressure, which is substantially the same for all of the measurements described herein and in the curves of the drawings (575 p.s.i.).

The two ends of the column are connected to a variable D.C. voltage source, and from voltage-current readings and measurements of the length of the column of grain, data is obtained that can be plotted to obtain curves such as those in the drawings.

The four curves in FIG. 1, A, B, C, and D, respectively, describe the resistivity characteristics at different electrical fields for typical samples of granular silicon carbide, 80 grit size, of four varieties of silicon carbide: colorless, commercial green, commercial black, and beta (cubic), respectively. The expression "80 grit" is used throughout to refer to a standard grain size as defined in the publication of the U.S. Department of Commerce, "Abrasive Grain Sizes."

As shown in FIG. 1, the resistivity of the green variety of silicon carbide is approximately 2 orders of magnitude larger than that of the black variety of silicon carbide. In the non-linear region, the black variety has a much greater rate of change of resistivity with change in the applied electrical field, than the green variety. The colorless variety of silicon carbide has an electrical resistivity that is higher than the resistivity of either the black variety or the green variety by several orders of magnitude. The beta variety of silicon carbide has an extremely low resistivity, by way of comparison.

*Example 1*

Commercial crystalline silicon carbide of the green variety is crushed to 80 grit size. The grain is then subjected to electrostatic separation to separate from the crushed green grain a cut of about 1% by volume of silicon carbide crystals that are essentially colorless. The colorless crystals are of substantially uniform characteristics. Several small lots of these crystals are taken from the batch for further processing, as described in this and subsequent examples.

One lot of colorless crystals is measured to determine its resistivity changes with changes in the applied electrical field, and the measurements are employed to plot curve E in FIG. 2.

Seven other similar lots of colorless crystals are then treated in accordance with this invention, by firing them in an atmosphere of nitrogen at different temperatures and for different times, to permit nitrogen to diffuse into the crystals to alter their electrical characteristics.

To fire a lot of the silicon carbide crystals of the colorless variety, it is placed in a spectrographic graphite crucible in the hot zone of a furnace, such as, for example, a carbon tube induction furnace. Any furnace which can reach temperatures on the order of about 1950° C., with a controlled atmosphere, can be used to practice the process of this invention. During firing, commercially pure nitrogen is fed into the furnace continuously, substantially at atmospheric pressure, to maintain an atmosphere of nitrogen about the silicon carbide crystals.

A black surface film of graphite is visible on each lot of the crystals after firing in nitrogen. Before it is possible to make accurate resistivity measurements or to inspect the color, this film of graphite is removed by roasting the crystals in oxygen at 900° C., then washing the crystals in acid to remove any other surface impurities.

Curves F through L inclusive demonstrate the effect of firing different lots of the silicon carbide crystals of the colorless variety in nitrogen, at the different temperatures and for the different times indicated in FIG. 2.

If the crystals are fired below 1500° C., very little diffusion of nitrogen into the crystals occurs, and neither color nor resistivity changes occur.

A lot of crystals that is fired at 1550° C. for thirty minutes (curve F) demonstrates a slight decrease in resistivity, and a rather marked change in the nature of the resistivity curve in the non-linear region. As higher temperatures are employed, successively greater decreases in resistivity are obtained. At a given temperature, a longer firing period effects an additional decrease in resistivity. During firing the crystals take on a green color, whose depth or intensity is substantially indirectly proportional to the resistivity; that is, the higher the resistivity, the more colorless the crystal, and the lower the resistivity, the more pronounced is the green color of the crystal.

In summary, diffusion of nitrogen into crystals of silicon carbide of the colorless variety occurs very slowly at temperatures below 1500° C. At temperatures above 1500° C., appreciable diffusion of nitrogen occurs, which is indicated qualitatively by a color change to green, and quantitatively as well as qualitatively by decreased resistivity. A change in the column resistivity of silicon carbide of the colorless variety, of hexagonal crystalline habit, of about seven orders of magnitude, is effected by firing the silicon carbide in nitrogen at 1950° C. Of the several varieties of silicon carbide, only the beta form exhibits a lower resistivity than the colorless silicon carbide that is processed in accordance with this invention; and beta silicon carbide is essentially a laboratory item at present in sizes as large as 80 grit and larger.

In firing the crystals of silicon carbide in accordance with this invention, temperatures up to about 2150° C. to 2200° C. can be used, but ordinarily it is preferred to fire the crystals at temperatures in the range 1900° C. to 2000° C. At temperatures above about 2150° C. to 2200° C., recrystallization begins to occur. This changes the silicon carbide crystals from their as-formed or preformed state, and phenomena occur other than diffusion phenomena. Moreover, at recrystallization temperatures, the crystals of silicon carbide sinter together to form a rigid mass, and in order to recover usable crystals, the mass must be crushed. This additional processing, and the more elevated temperatures, are undesirable since they add to the expense of processing the silicon carbide, and in addition introduce unknown factors into the process.

*Example 2*

Further to demonstrate the invention, additional lots of crystals of silicon carbide of the colorless variety are fired in a hydrogen atmosphere, and to the temperatures and for the times, respectively, indicated in FIG. 3, but otherwise substantially in accordance with the procedure described above.

In the case of the fired crystals whose electrical characteristics are described in curves N and P, the hydrogen is first passed through a mass of heated titanium sponge, before admitting it to the furnace chamber for contact with the silicon carbide crystals. This procedure is followed to remove any nitrogen that is present as an impurity, from the hydrogen gas, to permit a determination of whether the process goes forward in the absence of nitrogen atmosphere.

In the case of the fired crystals whose electrical characteristics are described in curves N and O, commercially pure hydrogen is employed to maintain the hydrogen atmosphere.

The lots of crystals, whose electrical characteristics are described respectively in curves M and N, are fired under substantially similar conditions, except that the hydrogen with which the grain of curve M is treated is nitrogen gettered. As the differences in resistivity between curves M and N indicate, the process is apparently more effective in the temperature range 1600° C. to 1650° C. when the hydrogen is not scavenged for nitrogen.

Curves O and P demonstrate that at the more elevated temperature of 1950° C., there is substantially little difference in the results that are obtained with an atmosphere of commercially pure hydrogen that has been nitrogen-gettered and with an atmosphere of commercially pure hydrogen.

Curves O and P indicate that the process effects a reduction in resistivity, over the resistivity of the silicon carbide crystals of the colorless variety as produced, on the order of five orders of magnitude. This reduction in resistivity compares favorably with the reduction in resistivity between curve E and curve K, in FIG. 2, where the grain, whose original resistivity is described in curve E and whose fired resistivity is described in curve K, was fired in a nitrogen atmosphere at 1950° C. for two and one-half hours, to effect a reduction in resistivity on the order of seven orders of magnitude.

These results lead to the conclusion that the amount of nitrogen, that diffuses into the crystal, is of such a low order of magnitude that diffusion occurs even when every attempt has been made to remove the nitrogen from the atmosphere.

*Example 3*

Additional lots of crystals of silicon carbide of the colorless variety are fired in argon at the temperatures and for the times shown in FIG. 4, and after cleaning the crystals, column resistivity measurements are made. The results are shown in FIG. 4.

The lots of crystals, whose characteristics are plotted in curve T, is subjected to firing in an argon atmosphere, from which the nitrogen is removed by passage of the argon over hot titanium sponge. The two lots of crystals, whose characteristics are described respectively in curves T and U, were fired otherwise under identical conditions. The differences in resistivity noted between the lots of crystals, whose characteristics are described respectively in curves T and U, are not considered of a significant order of magnitude.

As the curves in FIG. 4 indicate, substantial reductions in resistivity are obtained. However, by comparison with FIG. 2, it can be observed that when a nitrogen atmosphere is employed, the process is much more effective. It is noted that commercial argon contains a residual nitrogen content as an impurity.

*Example 4*

Two additional lots of crystals of silicon carbide of the colorless variety are fired respectively for five hours at 1650° C., and for two and one-half hours at 1950° C., in an argon atmosphere containing vaporized elemental phosphorus. The phosphorus vapor is formed by heating elemental red phosphorus to vaporize it into a stream of argon that is passed continuously into the furnace during firing.

As shown in curves V and W respectively, in FIG. 5, some reduction in resistivity occurs from firing at the lower temperature, and at the higher temperature, the reduction in resistivity is on the order of five orders of magnitude. In addition, the non-linear electrical characteristics of the silicon carbide appear to be affected in a manner that renders the treated grain suitable for applications where non-linear interfacial electrical conductivity is important.

*Example 5*

Another two samples of crystals of silicon carbide of the colorless variety are fired respectively for five hours at 1650° C., and for two and one-half hours at 1950° C., in an environment supplying free elemental silicon to the crystals.

Exposure to elemental silicon during firing is accomplished by depositing the crystals of silicon carbide in a small crucible of spectrographic graphite, that is formed with a plurality of apertures in its wall. This crucible is deposited in turn within a second, larger crucible of spectrographic graphite, and in the space between the walls of the two crucibles, free silicon is placed. The larger crucible is covered fairly tightly, so that after the silicon vaporizes it will be confined within the crucibles. The silicon carbide is then fired, and during firing, the elemental silicon vaporizes and makes contact with the crystals of silicon carbide. Resistivity measurements for the fired crystals are shown in curves Y and Z respectively, in FIG. 5.

Firing at the lower temperature effects a reduction in resistivity on the order of two orders of magnitude, and firing at the higher temperature effects a reduction in resistivity on the order of six orders of magnitude. Before making the resistivity measurements, care is taken to remove excess free silicon, insofar as possible, by washing the fired crystals with acids of the type commonly used for dissolving free silicon.

The results obtained by firing the silicon carbide in the presence of free silicon compare favorably with the results obtained by firing in an atmosphere of nitrogen, as is evident from a comparison of curve Z of FIG. 5 with curve K of FIG. 2.

Theoretically, it is possible for silicon carbide, that contains nothing but silicon and carbon, to act as an impurity semiconductor, provided that there are points in the crystal where the compound is at least locally not stoichiometric. Because of present analytical shortcomings, it is not possible to say whether the silicon firing process of this invention produces silicon carbide that is not stoichiometric. However, it is certain that the treated crystals contain no free silicon that can be removed by ordinary removal procedures; and that the treatment has a readily measurable effect in lowering the column resistivity of the silicon carbide crystals by many orders of magnitude.

*Example 6*

Silicon carbide crystals of the commercial green variety are fired in nitrogen under conditions of temperature and time similar to those under which the crystals of the colorless variety were subjected and from which curves F through L inclusive were obtained.

After cleaning the crystals in each case, to remove the graphite film and other surface impurities, resistivity measurements are made, and it is observed that most of the colorless particles are changed into lower resistivity green particles. A more uniform color, and more uniform electrical properties, are obtained.

After firing crystals of commercial green grain for two and one-half hours at 1980° C. in nitrogen, for example, a decrease in resistivity on the order of five orders of magnitude is obtained. If the electrical resistivity changes are plotted against changes in the electrical field, a curve is obtained that is approximately one to one and one-half units below curve L of FIG. 2, and substantially equidistant therefrom at all points along its length.

The resistivity is improved to such an extent, and rendered so uniform, as to open up applications for green grain for which it has not been considered satisfactory in the past. For example, ordinary commercial green grain is not ordinarily used in electrical resistance heating rods, because of its nonuniformity of electrical characteristics and high resistivity. Green grain treated in accordance with this invention has improved resistivity characteristics and is uniform in color and resistivity, and is useful, without any further special treatment, for electrical resistance heating rods, and also for lightning arrestor applications and for voltage sensitive resistors.

The residual green grain, from which the colorless grain has been removed by electrostatic separation, also is improved by firing in a nitrogen atmosphere in accordance with this invention. The conductivity is rendered more uniform and the resistivity is improved.

The process of this invention can be practiced to produce crystalline silicon carbide having a specific desired resistivity, by firing the silicon carbide for a predetermined time at a given temperature, in an environment that will supply an impurity of a desired kind that can diffuse into the crystals. While the process of the invention has greatest applicability to the treatment of discrete crystals of silicon carbide, it is also applicable to prous bodies of recrystallized silicon carbide. The process is effective for crystals and bodies of any desired, practical size. For larger crystals, longer processing times, at a given temperature, are required. For example, platelets about 0.020″ thick and having an average surface area, total, of about 1 cm.$^2$, can be processed effectively substantially under the same conditions as 80 grit grain, except that longer firing times may be required, depending upon the initial impurity of the platelets.

The products of the invention, by reason of their adjusted electrical properties, are especially adapted for use as grain for lightning arrestors, in voltage sensitive resistors, as thermistors, and in electrical resistance heating elements.

Nitrogen is the preferred impurity since it is inexpensive, easy to handle, clean, safe, and presents no problems of purification after firing. In the case of impurity materials other than nitrogen, it may be necessary to clean the crystals after firing, in order to remove excess free impurity material, that would exert an undesirable or unpredictable effect on the properties of the crystals. For example, when silicon carbide crystals are fired in admixture with free boron, in an inert atmosphere such as helium, at a temperature on the order of 1550° C., there is an apparent diffusion of boron into the silicon carbide crystals. The crystals take on a blue color and the resistivity is decreased by several orders of magnitude, although not as much as in the case of nitrogen treatment. After firing, in order to determine the characteristics of the silicon carbide crystals accurately, the excess free boron must be removed. This frequently presents a serious problem, since acid washes with a mixture of nitric and hydrofluoric acids, and mechanical processing and scrubbing, may be required.

Aluminum impurities may be introduced into the crystals in substantially the same manner, to effect improvement in the electrical characteristics. Removal of the aluminum excess must be accomplished for accurate determination of the crystal properties. To diffuse aluminum into silicon carbide crystals, aluminum compounds may be employed such as, for example, the aluminum halides, under carefully controlled conditions.

Somewhat similarly, silicon nitride can be used as the source of the impurity that is diffused into the crystal. When silicon nitride is employed, the quantity can be determined accurately in advance and carefully regulated. The use of silicon nitride permits the firing to take place in a closed vessel and eliminates the problems that are associated with maintaining a desired particular atmosphere during furnacing.

Silicon nitride decomposes below the preferred firing temperature range of 1900° C. to 2000° C., making available elemental silicon and elemental nitrogen in an active state. Conditions are very favorable for diffusion.

Ordinarily, it is preferred that a non-oxidizing, inert environment be maintained during firing to effect diffusion. If the impurity that is to be introduced is nitrogen, an atmosphere of nitorgen, or of nitrogen in admixture with an inert gas, such as argon, helium, or the like, is excellent. Atmospheric pressure is preferred, for simplicity of operation, but superatmospheric pressures can be used and, in general, increases the rate of diffusion.

The invention is primarily concerned with the alteration of the characteristics of discrete crystals of silicon carbide, of the green and colorless varieties. However, the invention is also applicable to beta silicon carbide, which is usually produced in relatively small quantities by the reaction of silicon tetrachloride with methane in a reducing atmosphere, at about 1600° C. If the temperature of transition from beta (cubic) to alpha (hexagonal) is exceeded, the beta silicon carbide crystals will convert to the alpha (hexagonal) form. Conversion is believed to begin at about 1500° C., and when beta crystals are heated to temperatures between 1500° C. and 2100° C., a mixture of the two crystalline phases is usually found.

Since the resistivity of silicon carbide crystals depends on the number of impurities in the crystals, and upon the mobility of the current carriers in the crystals, the resistivity of beta silicon carbide is relatively low. The beta (cubic) crystal form probably has a higher mobility for current carriers because of the simpler lattice structure.

While the invention has been described in connection with specific embodiments thereof, it will be understood that it is capable of further modification, and this application is intended to cover any variations, uses, or adaptations following, in general, the principles of the invention and including such departures from the present disclosure as come within known or customary practice in the art to which the invention pertains and as may be applied to the essential features hereinbefore set forth, and as fall within the scope of the invention or the limits of the appended claims.

I claim:

1. A process for adjusting the electrical characteristics of silicon carbide crystals selected from the group consisting of green and colorless silicon carbide crystals and comprising heating the crystals to a temperature of at least 1500° C. and below the temperature of recrystallization while maintaining the crystals as substantially discrete crystals, in an environment that supplies to the crystals an element selected from the group consisting of silicon and of elements from the third and fifth columns of the Mendeleeff Periodic Table for a period of time in the range from about 0.5 to about 5 hours to effect a desired change in the electrical characteristics thereof.

2. A process for adjusting the electrical characteristics of crystalline silicon carbide selected from the group consisting of green and colorless silicon carbide crystals and comprising heating the silicon carbide in a nitrogen-supplying environment to a temperature of at least 1500° C. but below the temperature of recrystallization of silicon carbide, for a period of time in the range from about 0.5 to about 5 hours to effect a desired change in the electrical characteristics thereof.

3. A process for adjusting the electrical characteristics of silicon carbide crystals selected from the group consisting of green and colorless silicon carbide crystals and comprising heating the crystals to a temperature of at least 1500° C. but below the temperature of recrystallization in an atmosphere of gaseous nitrogen, while maintaining the crystals as substantially discrete crystals and for a period of time in the range from about 0.5 to about 5 hours to effect a desired change in the electrical characteristics thereof.

4. A process for adjusting the electrical characteristics of silicon carbide crystals selected from the group consisting of green and colorless silicon carbide crystals and comprising heating the crystals to a temperature of at least 1500° C. but below the temperature of recrystallization, while maintaining the crystals as substantially discrete crystals, in an atmosphere of predominately gaseous hydrogen and for a period of time in the range from about 0.5 to about 5 hours to effect a desired change in the electrical characteristics thereof.

5. A process for adjusting the electrical characteristics of silicon carbide crystals selected from the group consisting of green and colorless silicon carbide crystals and comprising heating the crystals to a temperature of at least 1500° C. but below the temperature of recrystallization, while maintaining the crystals as substantially discrete crystals, in an atmosphere of predominately gaseous argon and for a period of time in the range from about 0.5 to about 5 hours to effect a desired change in the electrical characteristics thereof.

6. A process for adjusting the electrical characteristics of silicon carbide crystals selected from the group consisting of green and colorless silicon carbide crystals and comprising heating the crystals to a temperature of at least 1500° C. but below the temperature of recrystallization, in an environment that supplies to the crystals elemental silicon, for a period of time in the range from about 0.5 to about 5 hours to effect a desired change in the electrical characteristics thereof, while maintaining the crystals as substantially discrete crystals, and thereafter removing residual silicon from the crystals.

7. A process for adjusting the electrical characteristics of silicon carbide crystals selected from the group consisting of green and colorless silicon carbide crystals and comprising heating the crystals to a temperature of at least 1500° C. but below the temperature of recrystallization, in an environment that supplies to the crystals elemental phosphorus, for a period of time in the range from about 0.5 to about 5 hours to effect a desired change in the electrical characteristics thereof, while maintaining the crystals as substantially discrete crystals, and thereafter removing the residual phosphorus from the crystals.

8. A process for decreasing the column resistivity of colorless crystals of silicon carbide comprising heating the crystals in an environment that supplies to the silicon carbide an element selected from the group consisting of silicon and of elements from the third and fifth columns of the Mendeleeff Periodic Table, and to a temperature of at least 1500° C. and below the temperature of recrystallization for a period of time in the range from about 0.5 to about 5 hours to effect the desired decrease in column resistivity, while maintaining the crystals as substantially discrete crystals.

9. A process for adjusting the electrical characteristics of crystalline silicon carbide and comprising heating the silicon carbide to a temperature of at least about 1500° C. but below the temperature of recrystallization in an environment that supplies to the silicon carbide an element selected from the group consisting of silicon and of elements from the third and fifth columns of the Mendeleeff Periodic Table, and for a period of time in the range from about 0.5 to about 5 hours to effect a desired change in the electrical characteristics thereof.

References Cited in the file of this patent

UNITED STATES PATENTS

| | | |
|---|---|---|
| 1,246,165 | Ruzicka | Nov. 13, 1917 |
| 1,906,963 | Heyroth | May 2, 1933 |
| 2,854,364 | Lely | Sept. 30, 1958 |
| 2,916,460 | Van Der Beck | Dec. 8, 1959 |

FOREIGN PATENTS

| | | |
|---|---|---|
| 192,382 | Great Britain | Apr. 22, 1924 |
| 683,103 | Great Britain | Nov. 19, 1952 |

OTHER REFERENCES

Fetterley: "Electrical Conduction in Silicon Carbide," Technical Reviews, vol. 104, No. 5, May 1957, pages 322–327.

Kendall: "Electrical Conduction in Silicon Carbide," J. Chem. Physics, vol. 21, No. 5, May 1953, pages 821–827.